(12) United States Patent
Charpentier et al.

(10) Patent No.: US 9,475,473 B2
(45) Date of Patent: Oct. 25, 2016

(54) TANDEM MASTER CYLINDER SECONDARY PISTON AND MASTER CYLINDER EQUIPPED WITH SUCH A SECONDARY PISTON

(75) Inventors: Carole Charpentier, Montmorency (FR); Antony Auguste, Villiees/Marne (FR); Laurent Lhuillier, Le Blanc Mesnil (FR); Olivier Bernadat, Le Perreux (FR); Marc Rodriguez, Beverley Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 579 days.

(21) Appl. No.: 13/996,350

(22) PCT Filed: Dec. 5, 2011

(86) PCT No.: PCT/EP2011/071724
§ 371 (c)(1),
(2), (4) Date: Nov. 12, 2013

(87) PCT Pub. No.: WO2012/084468
PCT Pub. Date: Jun. 28, 2012

(65) Prior Publication Data
US 2014/0053546 A1 Feb. 27, 2014

(30) Foreign Application Priority Data
Dec. 21, 2010 (FR) .................. 10 05008

(51) Int. Cl.
*B60T 11/20* (2006.01)
*B60T 11/232* (2006.01)
*B60T 11/236* (2006.01)
*B60T 11/228* (2006.01)

(52) U.S. Cl.
CPC .............. *B60T 11/20* (2013.01); *B60T 11/232* (2013.01); *B60T 11/236* (2013.01); *B60T 11/228* (2013.01)

(58) Field of Classification Search
CPC .... B60T 11/20; B60T 11/228; B60T 11/232; B60T 11/236
USPC ......................................................... 60/562
See application file for complete search history.

(56) References Cited

U.S. PATENT DOCUMENTS 2,800,142 A * 7/1957 Champion ............ F16K 15/026
137/543.19
4,656,924 A * 4/1987 Chatterjea ............... B60T 13/12
188/285

(Continued)

FOREIGN PATENT DOCUMENTS

CN        1458890        11/2003
CN        1899896        1/2007

(Continued)

*Primary Examiner* — F. Daniel Lopez
*Assistant Examiner* — Richard Drake
(74) *Attorney, Agent, or Firm* — Norton Rose Fulbright US LLP

(57) ABSTRACT

A master cylinder having a primary piston and a secondary piston is described. The secondary piston is realized of plastic material; it is composed of a skirt and an end wall. The forward edge of the skirt is equipped with longitudinal slots intended to cooperate with the resupply seal to resupply the secondary pressure chamber and ensure operation in rest position whenever the brake circuit is in ESP mode. Supply occurs from the supply chamber, which is connected to the brake fluid reservoir.

8 Claims, 3 Drawing Sheets

(56) References Cited

U.S. PATENT DOCUMENTS

| | | | |
|---|---|---|---|
| 5,878,575 A | 3/1999 | Kreh et al. | |
| 6,612,339 B1* | 9/2003 | Wilke | B60T 8/368 138/30 |
| 7,040,093 B2* | 5/2006 | Legret | B60T 11/232 60/586 |
| 2005/0044852 A1 | 3/2005 | Tsubouchi et al. | |
| 2008/0022675 A1* | 1/2008 | Drott | B60T 11/16 60/588 |
| 2008/0216473 A1* | 9/2008 | Kim | B60T 11/236 60/588 |
| 2008/0289329 A1* | 11/2008 | Gaffe | B60T 11/232 60/588 |

FOREIGN PATENT DOCUMENTS

| | | |
|---|---|---|
| CN | 101746367 | 6/2010 |
| DE | 102006000341 | 1/2007 |
| EP | 2199164 | 6/2010 |
| FR | 2820701 | 8/2002 |
| JP | H0653349 | 7/1994 |
| JP | H11115725 | 4/1999 |
| JP | 2008285153 | 11/2008 |

\* cited by examiner

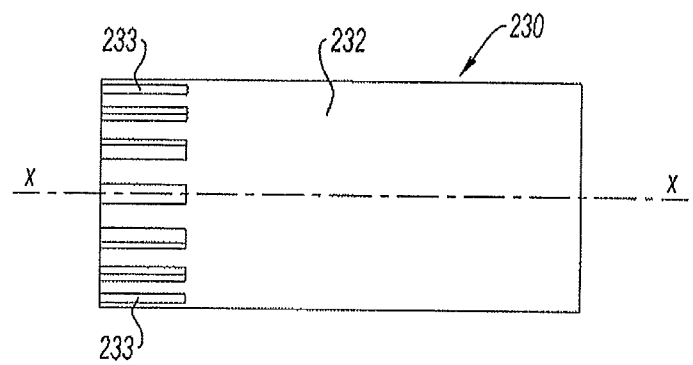
Fig. 2
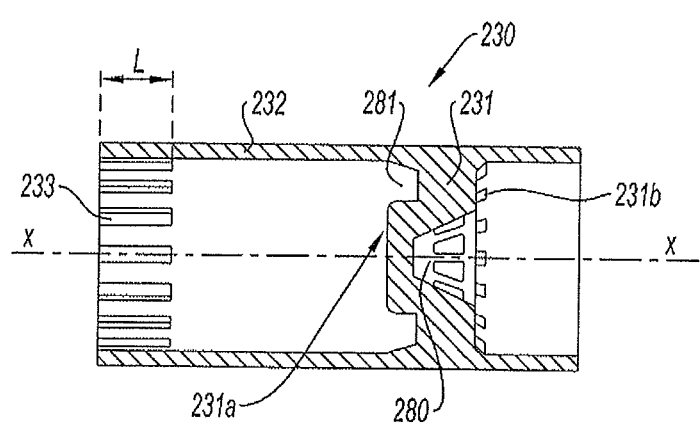
Fig. 3
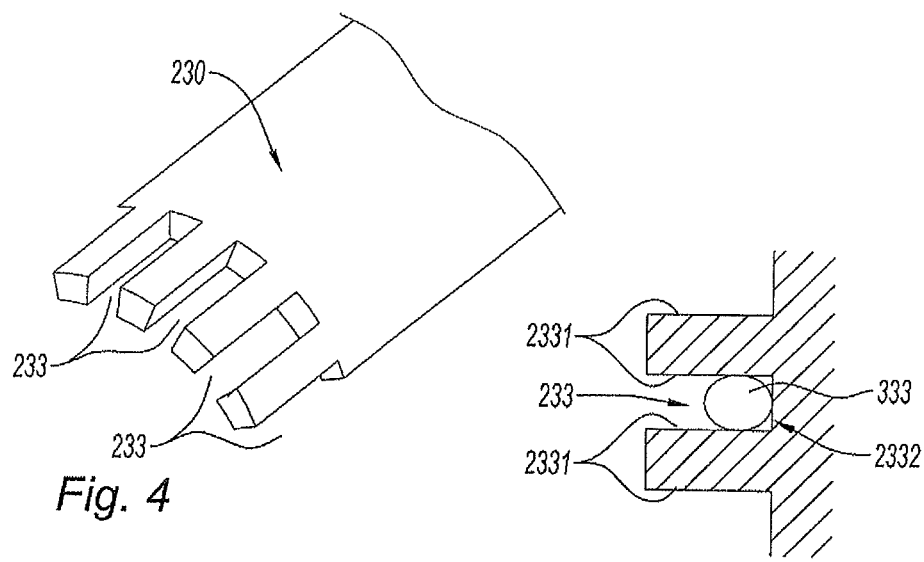
Fig. 4
Fig. 5

TANDEM MASTER CYLINDER SECONDARY PISTON AND MASTER CYLINDER EQUIPPED WITH SUCH A SECONDARY PISTON

FIELD OF THE INVENTION

The present invention relates to a tandem master-cylinder secondary piston that includes a cylindrical skirt having a free front end and an end wall for its activation on one face by the thrust rod of the primary piston and on the other face by the return spring. The piston delimits a pressure chamber in the master cylinder, and the forward edge of the piston in a rest position cooperates with a seal housed in a groove in the body of the master cylinder and separates the supply chamber from the pressure chamber while allowing hydraulic fluid to travel through passages in the skirt when the brake system is in ESP mode, dynamic stability control.

The present invention also relates to a tandem master cylinder equipped with a secondary piston as described above.

BACKGROUND INFORMATION

FIGS. 6 and 7 illustrate a tandem master cylinder according to the state of the art. This master cylinder 300, only the portion of which near secondary cylinder 330 is shown, consists of body 310 with bore hole 320 in which is housed secondary piston 330 and, if need be, a primary piston, not shown, if master cylinder 300 is a tandem master cylinder. Actuation of the master cylinder occurs in the direction of arrow AF. In bore hole 320, secondary piston 330 delimits pressure chamber 340 connected to the secondary brake system. Pressure chamber 340 is fed with brake fluid from supply chamber 350. Pressure chamber 340 is separated from supply chamber 350 by resupply seal 353 placed in groove 351 of body 310. On the other side of supply chamber 350, impermeability with the exterior is provided by seal 380 housed in groove 352 of body 310 and pressing against secondary piston 330. Secondary piston 330 consists of end wall 331, wherein rear face 331b receives the thrust rod from the servobrake and face 331b receives telescoping rod 370, formed of two parts and kept separated by spring 373. This rod 370 is connected to the primary piston.

Secondary piston 330 is a machined aluminum part with a cylindrical skirt 332 equipped with end wall 331, one face of which, 331b, is equipped with a frustoconical housing to receive the end of thrust rod 370 connected to primary piston 132 and whose other face, 331a, serves as a support for return spring 373. The forward edge of skirt 332 has a frustoconical surface 334 traversed by a crown of holes 333. Secondary piston 330 delimits secondary pressure chamber 340 of secondary circuit C2 in the master cylinder and cooperates with resupply seal 353 housed in groove 351 machined in bore hole 320. This groove 351 is located beyond supply chamber 350, connected to the hydraulic fluid supply line; seal 353, cooperating with the exterior surface of secondary piston 330, thereby ensures a seal between supply chamber 350 and pressure chamber 340. However, when secondary piston 330 is in rest position, its front edge is positioned slightly forward of supply chamber 350 so that brake fluid can pass beneath the seal through holes 333 in the front of skirt 332 of secondary piston 330 and reach pressure chamber 340.

Such a piston and master cylinder are described in German Published Patent Application No. 10 2006 000341.

FIG. 7 is an axial cutaway of secondary piston 330, which is known, illustrating the shape of skirt 332 with its frustoconical front portion 334 and crown of holes 333, as well as the shape of end wall 331, with face 331a and a boss for centering spring 373 (FIG. 6), and other face 331b with a frustoconical housing to accommodate telescoping rod 370 connected to the principal piston.

FIG. 6A, which is a very schematic cutaway, illustrates the rest position of resupply seal 353 in its groove 351 of body 310 of the master cylinder, as well as supply chamber 350 and skirt 332 of secondary piston 330, with the crown of holes here represented by a single hole, 333, placed beneath seal 353. An arrow indicates the passage of hydraulic fluid during the resupply phase, between supply chamber 350, hole 333, the interior of secondary piston 330 and, in front of it, pressure chamber 340. This figure emphasizes the need for the conical shape, for the flow rate in rest position during ESP operation of the brake system is a function of the diameter of the holes as well as the space between the piston and body 310 of the master cylinder.

This secondary piston 330 has a certain number of manufacturing as well as functional drawbacks:

Manufacturing is relatively expensive because of the crown of holes 333 that needs to be made in the front edge of skirt 332 and because of the frustoconical shape 334 that is given to the edge of the skirt. Additionally, holes 333 realized in the edge of the skirt often have burrs that cause premature wear to seal 353, which cooperates with secondary piston 330.

SUMMARY

An object of the present invention is to develop a master cylinder secondary piston and a master cylinder so equipped that avoids the problems of seal wear, facilitates the realization of the piston, reduces manufacturing costs, and guarantees flow-rate performance in ESP mode.

To that end, an object of the present invention is a master-cylinder secondary piston of the type described above, wherein the front edge of the skirt has a crenellated profile formed of radial slots open in front to cooperate with the master cylinder supply chamber.

The secondary piston according to the present invention offers the advantage of simplified manufacture because the holes and frustoconical front portion of the known piston are replaced by simple slots. The surrounding jacket of the piston is thus cylindrical throughout its entire length. The shape of the slots also has the advantage of making the resupply of the pressure chamber simpler and more efficient than through the holes by guaranteeing the flow rate in ESP mode.

According to another advantageous characteristic, the slots are radial and parallel to the xx axis of the piston.

The secondary piston according to the present invention is preferably made of injection-molded plastic material; the skirt and end wall are, notably, made of a single piece.

According to another advantageous characteristic, the radial slots have a straight end wall and sides defined by radially directed planes. The end wall, or rear end, enclosed by slots, is preferably straight, transversely directed and, significantly, consists of a plane surface. This surface may be inclined with respect to the axis of the piston or perpendicular to it.

The shape of the radial slots enables the very simple realization of the injection mold and facilitates unmolding.

According to another advantageous characteristic, the radial slots are parallel to the axis of the secondary piston.

According to another advantageous characteristic, the radial slots are helical in shape, which means that, at every point, the walls of the slot are directed radially but the alignment of the whole is helical. This helical shape promotes contact with the resupply seal by preventing it from being permanently in contact with the hollows of the slots or with the solid surface between the slots.

The end wall of the slot is preferably straight, that is, in a plane perpendicular to the axis of the secondary piston.

The present invention also relates to a tandem master cylinder equipped with a secondary piston wherein:
- a cylindrical skirt has a free front end and an end wall for its actuation on one face by the push rod of the primary piston and on the other face by the return spring,
- the piston delimits a pressure chamber in the master cylinder,
- the front edge of the piston in rest position cooperates with a seal housed in a groove in the body of the master cylinder and separates the supply chamber from the pressure chamber by allowing hydraulic fluid to pass through passages in the skirt whenever the brake system is in ESP mode,
- the edge of the skirt has a crenellated profile formed by radial slots open in front, and
- this secondary piston is made by molding/injection of a plastic material.

BRIEF DESCRIPTION OF THE DRAWINGS

FIG. 2 is a side view of a secondary piston according to the present invention.

FIG. 3 is an axial cutaway of the secondary piston of FIG. 2.

FIG. 4 is a partial perspective view of the secondary piston skirt.

FIG. 5 is a developed view of a slot of the secondary piston.

DETAILED DESCRIPTION

Figure 1:
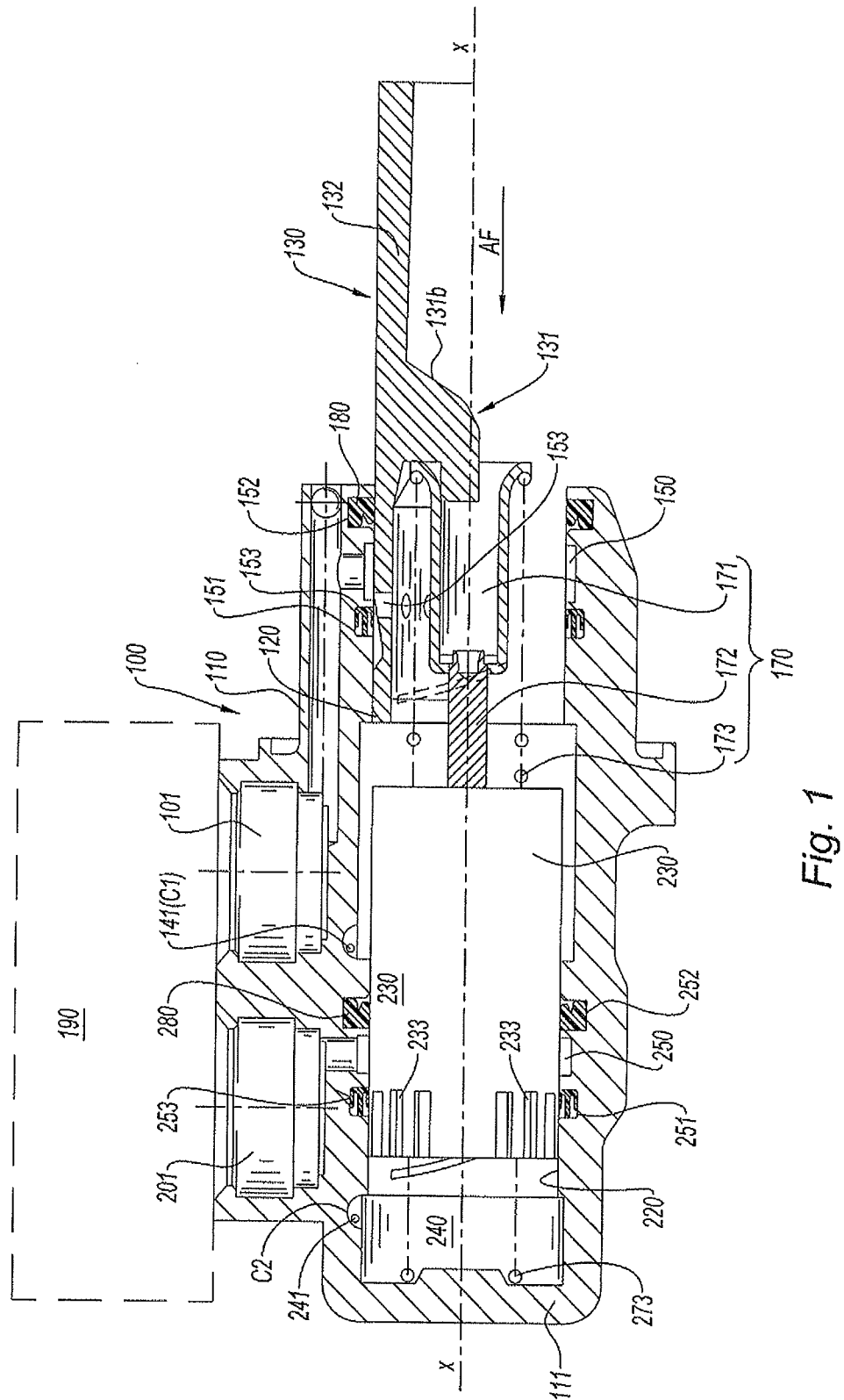
FIG. 1 is a schematic cutaway of a tandem master cylinder equipped with a secondary piston according to the present invention.

FIG. 1 shows tandem master cylinder 100 according to an exemplary embodiment of the present invention, whose secondary portion is described below, it being understood that this description applies in practice to its first portion for all the elements involved in the duplication and which enable control of two independent brake circuits C1, C2.

Master cylinder 100 consists of body 110 traversed by bore hole 120 with axis (xx) accommodating primary piston 130.

Primary piston 130 and bore hole 220 house secondary piston 230.

The direction of movement of pistons 130, 230 is indicated by arrow AF, which corresponds to a braking action.

The top of the master cylinder is equipped with two inlets 101, 201 for the outlet fittings of the brake fluid reservoir 190, which is simply sketched.

Secondary piston 230 delimits, in bore hole 220, pressure chamber 240 connected to brake circuit C2 by drill hole 241 emerging into chamber 240. This pressure chamber 240 is separated by hollow piston 230 from supply chamber 250 realized in body 110 of master cylinder 100 and, between bore hole 220 and the outer surface of piston 230, is materialized by a peripheral groove in the bore hole. Supply chamber 250 is bordered on both sides by peripheral groove 251, 252 emerging into the bore hole. Front groove 251 accommodates peripheral resupply seal 253, and rear groove 252, peripheral seal 280, still referred to as an isolation seal.

Resupply seal 253 allows brake fluid to be supplied from pressure chamber 240 in the event of a lack of brake fluid or a sudden braking action. The movement of opening and closing this resupply seal 253 is described in document FR 2,916,405. Seal 280, which separates supply chamber 250 [from] the other pressure chamber, 140, is designed to provide a seal between bore hole 220 and the surface of piston 230.

The two pistons 130, 230 are connected by telescoping rod 170, formed of two parts 171, 172 kept apart by spring 173, both of which extremities are applied, one against end wall 131 of primary piston 130 and the other against end wall 231 of secondary piston 230.

The description of the secondary portion of master cylinder 100, provided above, is transposed to its primary portion; there is a duplication of the pressure element of both brake circuits C1, C2. The description given above can be applied, under the same conditions, to the elements relating to the present invention, which bear the same reference numbers but decreased by 100.

As shown in FIGS. 2 and 3, secondary piston 230 is composed of cylindrical skirt 232 equipped with end wall 231 whose rear face 231b, turned toward the primary piston, has frustoconical housing 280, which accommodates the end of thrust rod 170, connected to primary piston 130, and whose other face, 231a, is equipped with groove 281 to receive the piston's helical return spring 273. This spring 273 presses against end wall 111 of bore hole 220 of the master cylinder.

The front edge of skirt 232, that is, the edge not turned toward the principal piston, is crenellated along a certain axial length L, with slots 233 having a rectangular section aligned along the xx axis. These radial slots 233 are open near the front edge of the skirt; they are rectangular in shape. Edges 2331 of slot 233 are delimited by radial planes and the rear, 2332, is straight. The rear edge is straight, that is, transverse and, in this example, all the rear edges are located in the same circle. The rear edge may consist of a plane surface inclined to the xx axis or perpendicular to that axis.

The shape of the crenellated front edge is shown more clearly in FIG. 3, represented in perspective.

The rear face consists of ribs that have two functions:
to facilitate filling the piston with plastic during injection.

According to an embodiment not shown, slots 233 are helical in shape.

FIG. 5 shows, by way of comparison, the developed shape of a slot 233 of the secondary cylinder of FIGS. 3 to 5 and a hole 333 of known secondary piston 330.

Figure 6:
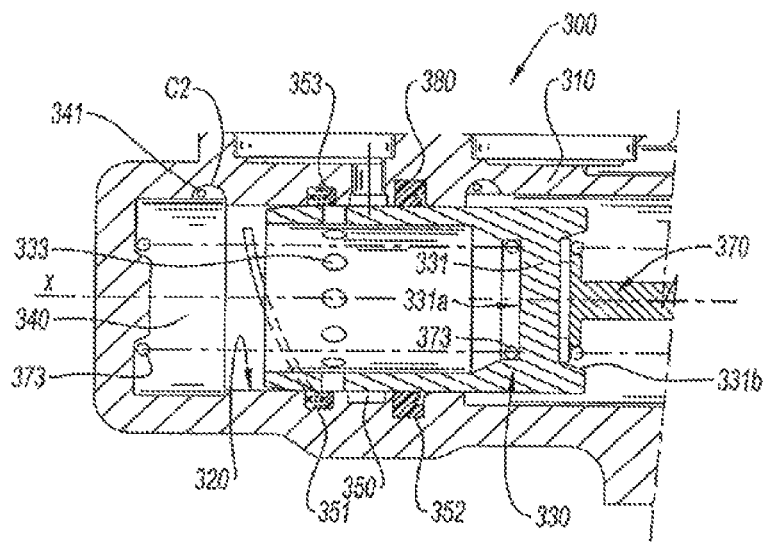
FIG. 6 is a partial cutaway of a known master cylinder with its secondary piston.
Figure 6A:
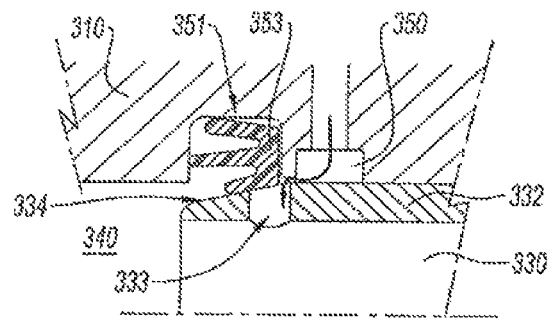
FIG. 6A is a detail view illustrating the cooperation of the front edge of the skirt of the secondary piston with the resupply seal housed in the groove of the yoke, according to the state of the art.
Figure 7:
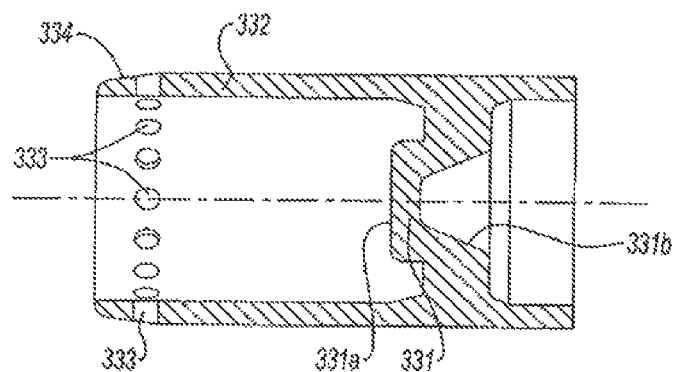
FIG. 7 is a cutaway view of the known secondary piston.

Superimposition of the two embodiments of the passages shows that slot 233, which serves as a passage for the hydraulic fluid in the piston according to the present invention, has a different section near the edges of the hole and that this difference in section does not require a cone to allow flow in ESP mode, as shown in FIGS. 6 and 7. This superimposed image shows rear edge 2331 of slot 233 and the contour of hole 333, which promotes the flow area of slot 233 of the secondary piston according to the present invention and provides clearance for the rounded contour of hole 233 and the frustoconical shape of the state of the art for the flow of liquid in ESP mode.

The secondary piston according to the present invention is made of molded/injected plastic material so that the edges of the teeth or slots of the front edge have a molding fillet rather than sharp edges, without requiring any special machining.

The secondary piston according to the present invention with straight radial slots is made without requiring a special mold to enable unmolding. This is done in the direction of the xx axis of the secondary piston.

In the case of slots that are not rectilinear but helical, unmolding may require a relative rotational movement between the part and the mold.

The secondary piston according to the present invention is preferably realized of a plastic material chosen from the group comprising: Bakelite, among thermoset materials, and polypropylene, among thermoplastic materials.

Assembly of the tandem master cylinder equipped with a secondary piston according to the present invention takes place without any particular difficulty and without having to modify production lines. The simplified shape of the secondary piston simplifies the manufacturing process, which becomes less expensive.

During use, the master cylinder functions with good flow rate performance, especially when operating in ESP mode.

Finally, the elimination of machining and, therefore, of any machining burrs, further simplifies the manufacturing process and makes it less expensive.

The number of slots and their, preferably uniform, distribution along the periphery of the front edge of secondary piston 230 has been determined by hydraulic studies and tests. The length (L) of slots 233 is defined, based on the geometry of the tandem master cylinder, to have the rest position of the secondary piston with respect to resupply seal 253 and enable such resupply and operation in ESP mode.

The invention claimed is:

1. A secondary piston of a tandem master cylinder, comprising:
    a cylindrical skirt having a free front end and an end wall, the cylindrical skirt being actuatable on a first face of the end wall by a thrust rod of a primary piston and on a second face by a return spring, wherein:
        the secondary piston delimits a pressure chamber in the master cylinder,
        a forward edge of the secondary piston in a rest position cooperates with a seal housed in a groove in a master cylinder body and separates a supply chamber from the pressure chamber while allowing a hydraulic fluid to pass through passages in the skirt when a brake system is in an ESP mode or is arranged for a resupply, and
        an edge of the skirt includes a crenellated profile formed of slots open in front, wherein the radial slots have a straight planar bottom surface that is perpendicular to an axis of the secondary piston.

2. The secondary piston according to claim 1, wherein the slots are radial and parallel to the axis of the secondary piston.

3. The secondary piston according to claim 2, wherein the radial slots have sides defined by radially directed planes.

4. The secondary piston according to claim 1, wherein the slots are helical.

5. The secondary piston according to claim 1, wherein the secondary piston is made by injection molding a plastic material.

6. A tandem master cylinder, comprising:
    a secondary piston that includes:
        a cylindrical skirt having a free front end and an end wall, the cylindrical skirt being actuatable on a first face of the end wall by a thrust rod of a primary piston and on a second face by a return spring, wherein:
        the secondary piston delimits a pressure chamber in the master cylinder,
        a forward edge of the secondary piston in a rest position cooperates with a seal housed in a groove in a master cylinder body and separates a supply chamber from the pressure chamber while allowing a hydraulic fluid to pass through radial slots in the skirt when a brake system is in an ESP mode,
        an edge of the skirt includes a crenellated profile formed of the radial slots, wherein the radial slots are open in front and have a straight planar bottom surface that is perpendicular to an axis of the secondary piston, and wherein the secondary piston is made by injection molding with a plastic material.

7. The secondary piston of a tandem master cylinder of claim 1, wherein the cylindrical skirt further includes a frustoconical housing situated in the end wall, wherein the frustoconical housing accommodates the thrust rod of the primary piston.

8. The tandem mast cylinder of claim 6, wherein the cylindrical skirt of the secondary piston further includes a frustoconical housing situated in the end wall, wherein the frustoconical housing accommodates the thrust rod of the primary piston.

* * * * *